Feb. 13, 1962  K. RÄNTSCH ET AL  3,020,802
BINOCULARS HAVING SHOCK ABSORBING COVERING
Filed Sept. 28, 1959  2 Sheets-Sheet 1

United States Patent Office
3,020,802
Patented Feb. 13, 1962

1

3,020,802
BINOCULARS HAVING SHOCK ABSORBING COVERING
Kurt Räntsch, Wetzlar (Lahn), and Ludwig Faust, Braunfeld, Kreis Wetzlar, Germany, assignors to M. Hensoldt & Söhne, Optische Werke A.G., Wetzlar (Lahn), Germany
Filed Sept. 28, 1959, Ser. No. 842,788
Claims priority, application Germany Sept. 27, 1958
3 Claims. (Cl. 88—34)

The invention relates to improvements in binoculars and is particularly directed to means for protecting the binoculars against damage.

It is an object of the invention to provide the casing of the binoculars with elastic shock absorbing coverings consisting preferably of soft rubber.

It is another object of the invention to provide the shock absorbing covering with exterior ribs extending substantially parallel to the optical axis of the objectives provided in the binoculars for the purpose of improving the gripping traction.

Still another object of the invention is to provide the outsides of the objective mounts and the ocular mounts of the binoculars with protective soft rubber sleeves which are provided with fold-over covers for the objectives and the oculars. These covers assure that the entire binocular, including the lenses of the same, is protected by a coating of soft rubber.

Preferably, the fold-over covers are attached to the soft rubber sleeves by means of T-shaped soft rubber parts. For the purpose of attaching these T-shaped soft rubber parts to the sleeves, the latter are each provided with a slot into which the T-shaped parts are inserted. These T-shaped parts, after the sleeves have been attached to the relatively long objective mounts, are arranged between the latter and the sleeves, but when the objective mounts are relatively short, then these T-shaped parts are arranged between the sleeves and the lower covers for the objective mounts.

This arrangement has the advantage that compared with a rivet connection the covers cannot be torn from the sleeves.

This arrangement is, however, not particularly suited for the oculars of the binocular because there is not sufficient space available for the T-shaped connection pieces. For this reason, it is a further object of the invention to make the fold-over covers integral with the ocular covering sleeves. This integral structure of the parts is preferably made in such a manner that the ocular covers in their detached position extend approximately in the axial direction of the ocular mounts so that the covers, at the same time, prevent the entrance of light when the binocular is used.

It has also been discovered that it is of advantage to attach the fold-over covers in such a manner to the protecting rubber sleeves that the covers in their folded-over position may be attached to the objectives or the oculars and in their detached position assume their normal position. In such a case the covers jump automatically into their normal position as soon as they are removed from the objective and oculars, respectively.

The drawing illustrates different embodiments of the invention, namely

2

In the remaining FIGURES there are illustrated in perspective drawing—

Figure 3:
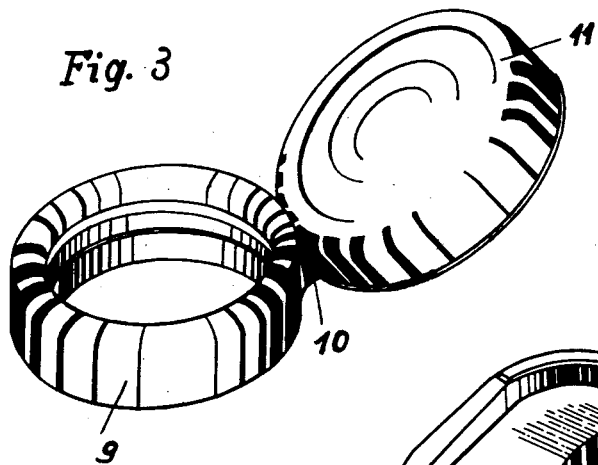
Figure 4:
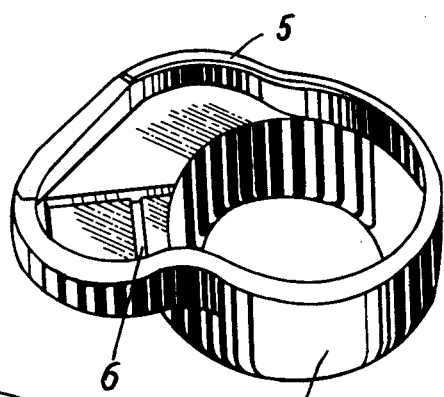
Figure 5:
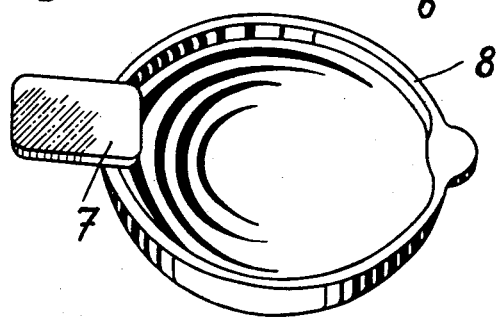

In FIG. 3 the ocular rubber sleeve with folded-over cover;

In FIG. 4 the objective rubber sleeve;

In FIG. 5 the objective rubber cover, and

Figure 6:
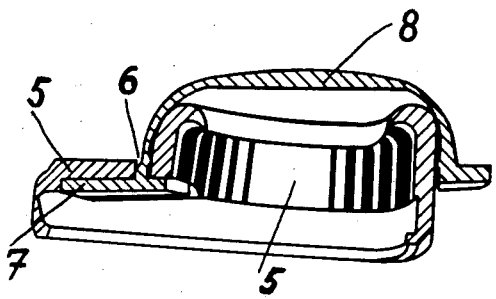

In FIG. 6 partly in section the objective rubber sleeve with its cover slipped over.

Figure 1:
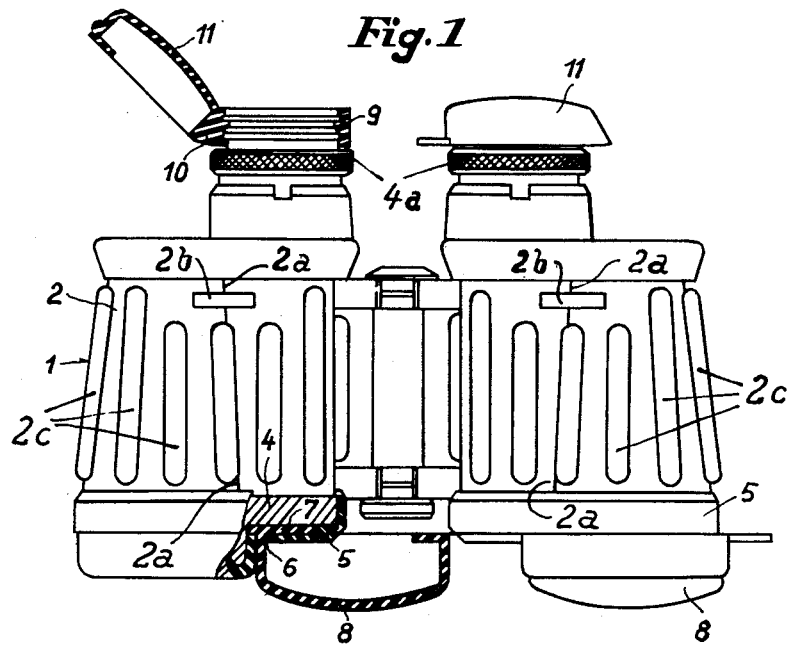
FIG. 1 illustrates a side elevation view of one binocular protected in accordance with the invention by a rubber covering.
Figure 2:
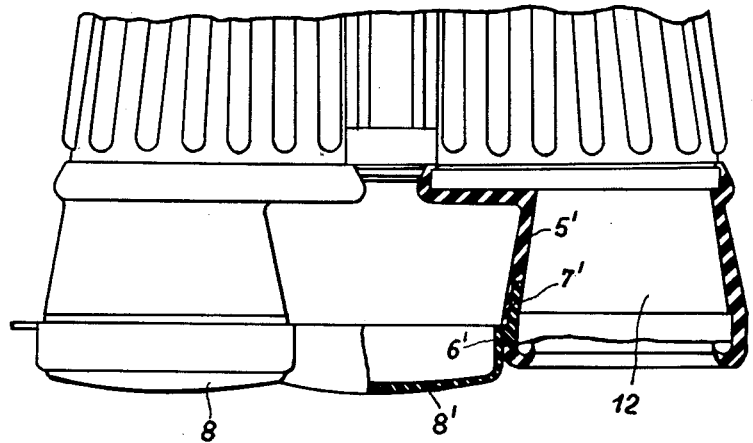
FIG. 2 illustrates in a side elevation view another embodiment of the invention.

Referring to the FIGS. 1 and 2, the binoculars illustrated have each a casing 1 which is covered on all of its exposed surfaces with soft rubber. The covering 2 for each half of the casing 1 is made of a flat piece of molded or cast sheet of rubber which is wrapped and cemented around the halves of the casing and forms seams at 2a. Each half of the casing contains the optical elements for one eye. FIG. 1 illustrates also that there is provided across each seam 2a a loop-shaped member 2b for attachment of a carrying strap. The outer surface of the two coverings 2 is provided with a plurality of substantially parallel ribs 2c which extend parallel to the optical axes and improve the grip of the user on the binocular. Each objective mount 4 has attached thereto a rubber sleeve 5. These sleeves 5 are each provided with a slot 6 into which is inserted a T-shaped part 7 extending from a fold-over cover 8. This T-shaped rubber part 7 is positioned between the lower end of the mount 4 of the binocular and the sleeve 5. In the right hand portion of FIG. 1 the cover 8 is shown as being in applied position in which the objective lens in the mount 4 is covered. The left hand portion of the binocular shows the cover 8 as being removed from the end of the objective mount 4 so as to expose the lens therein.

The ocular mounts 4a are also provided with soft rubber sleeves 9. Each sleeve 9 is integrally formed with a somewhat triangular rubber piece 10 and the latter has attached thereto a cover 11. The covers 11 also attached to the ocular mounts 4a by being folded over in such a manner that in their folded-over position, as shown in the right hand half of the FIG. 1, the oculars are closed or covered. The rubber piece 10 has such a shape and such a position that the cover 11, when it has been removed from the ocular, extends approximately in the axial direction of the ocular mounts so that the covers 11 form a certain protection against a lateral entrance of light into the oculars.

FIG. 2 illustrates a somewhat modified construction of the binocular which requires a somewhat modified arrangement of the soft rubber cover. In this FIG. 2 the objective mounts are somewhat longer in axial direction than in FIG. 1. The covers 8' for the objectives of the binocular are again provided with T-shaped rubber pieces 7'. These pieces 7' are again inserted in a slot 6' of the sleeves 5'. The T-shaped pieces 7', however, arranged in this modification between the objective mount 12 and the sleeve 5'.

What we claim is:

1. In a binocular having a casing, objective and ocular lens mounts, an elastic shock absorbing covering extending over the entire outer surface of said casing, elastic shock absorbing sleeves on said objectives and ocular mounts, elastic covers for said sleeves having integral flange portions which are directed away from the respective oculars and objectives in their open position, said elastic covers and flanges being directly attached at one outer portion of the sleeves and being elastically inverted to grip the sleeve ends when the covers are flexed to a closed position.

2. A binocular as set forth in claim 1 in which the elastic shock absorbing sleeves are integral with the flanged covers.

3. A binocular as set forth in claim 1 in which the flanged covers are provided with soft rubber T-shaped projections adapted to be removably secured in a slot formed in said ocular and objective sleeves.

References Cited in the file of this patent

UNITED STATES PATENTS

| | | |
|---|---|---|
| 2,291,821 | McNabb | Aug. 4, 1942 |
| 2,372,479 | French | Mar. 27, 1945 |